US007623162B2

(12) United States Patent
Inaba

(10) Patent No.: US 7,623,162 B2
(45) Date of Patent: Nov. 24, 2009

(54) SIGNAL PROCESSING DEVICE AND METHOD FOR REDUCING INFLUENCE ON COLUMN NOISE DETECTION FROM DEFECTIVE PIXELS

(75) Inventor: Seijiro Inaba, Kanagawa (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 11/172,859

(22) Filed: Jul. 5, 2005

(65) Prior Publication Data
US 2006/0006426 A1     Jan. 12, 2006

(30) Foreign Application Priority Data
Jul. 7, 2004    (JP)    ............................ P2004-201016

(51) Int. Cl.
*H04N 9/64* (2006.01)
(52) U.S. Cl. ...................................... 348/246; 348/241
(58) Field of Classification Search ......... 348/241–257, 348/222.1
See application file for complete search history.

(56) References Cited

U.S. PATENT DOCUMENTS

| 5,617,461 | A  |   | 4/1997  | Schreiner |
| 6,296,387 | B1 |   | 10/2001 | Guillenmaud |
| 6,418,241 | B1 |   | 7/2002  | Schreiner |
| 6,525,769 | B1 |   | 2/2003  | Thomas et al. |
| 6,753,913 | B1 |   | 6/2004  | Bilhan et al. |
| 6,879,721 | B2 | * | 4/2005  | Bradburn ..................... 382/205 |
| 7,092,018 | B1 | * | 8/2006  | Watanabe .................... 348/247 |
| 7,098,950 | B2 | * | 8/2006  | Yamamoto et al. .......... 348/243 |
| 7,327,392 | B2 | * | 2/2008  | Matsuyama et al. ......... 348/246 |

FOREIGN PATENT DOCUMENTS

| DE | 195 27 148 C1  | 9/1997 |
| DE | 199 15 851 A1  | 7/2000 |
| EP | 1 143 706 A2   | 10/2001 |

(Continued)

*Primary Examiner*—Lin Ye
*Assistant Examiner*—Nelson D. Hernández Hernández
(74) *Attorney, Agent, or Firm*—Finnegan, Henderson, Farabow, Garrett & Dunner, L.L.P.

(57) ABSTRACT

The present invention provides a signal processing device which, even when a defective pixel exists in the VOPB area B, can detect column noise accurately, and can carry out column noise correction. The signal processing device includes a solid-state image pickup element having a pixel part including an effective pixel area to be irradiated with light, and a vertical light-shielded pixel area where irradiation of light is shielded, a vertical scanning circuit, a horizontal scanning circuit, and an output circuit, a clamp section which clamps, to a predetermined reference value, black level values of pixel signals from the vertical light-shielded pixel area and effective pixel area, a threshold determination section which determines a threshold value, based on the predetermined reference value, a determination section which determines whether or not pixel signals from the vertical light-shielded pixel area that have the black level value clamped to the reference value by the clamp section exceed the threshold value determined by the threshold determination section, a defective pixel detector which detects a defective pixel among pixels arranged in the vertical light-shielded pixel area, and a signal processor which performs a predetermined signal processing on pixel signals from the vertical light-shielded pixel area that have a black level value clamped to the reference value by the clamp section.

7 Claims, 6 Drawing Sheets

FOREIGN PATENT DOCUMENTS

| | | |
|---|---|---|
| JP | 10-126697 | 5/1998 |
| JP | 10-341375 | 12/1998 |
| JP | 2002-077738 | 3/2002 |
| JP | 2002077738 A * | 3/2002 |
| JP | 2003-198946 | 7/2003 |
| JP | 2003-298949 | 10/2003 |
| JP | 2004-187163 | 7/2004 |
| JP | 2005-101829 | 4/2005 |

* cited by examiner

SIGNAL PROCESSING DEVICE AND METHOD FOR REDUCING INFLUENCE ON COLUMN NOISE DETECTION FROM DEFECTIVE PIXELS

CROSS REFERENCES TO RELATED APPLICATIONS

The present invention contains subject matter related to Japanese Patent Application JP 2004-201016 filed in the Japanese Patent Office on Jul. 7, 2004, the entire contents of which being incorporated herein by reference herein.

BACKGROUND OF THE INVENTION

1. Field of the Invention

The present invention relates to a signal processing device and a signal processing method in which an image of an object is picked up by use of an XY address type solid-state image pickup element.

2. Description of the Related Art

In a solid-state image pickup element of an XY address type represented by a CMOS (complementary metal oxide semiconductor) sensor, a large number of pixels are arrayed in a matrix of lines and columns, as shown in FIG. 1. The element has a vertical scanning circuit 54 to select sequentially lines of a pixel part 52, a horizontal scanning circuit 60 to select sequentially columns of the pixel part 52, and an output circuit 61 to output signals.

The vertical scanning circuit 54 and the horizontal scanning circuit 60 are constituted by, for example, shift-registers, and generate one vertical scanning pulse and one horizontal scanning pulse for every line and column, respectively.

When reading image signals charged in respective pixels, a pulse signal is added to one vertical selection line 53 by the vertical scanning circuit 54, to electrically conduct all pixel transistors 51 in one line. Image signals are read from respective photosensitive parts 50 onto vertical signal lines 55. The image signals read onto the vertical signal lines 55 are fed to circuits such as a correlative double sampling circuit (CDS) 56 and the like to remove an offset signal for every pixel.

The horizontal scanning circuit 60 adds a pulse signal to transistors 57 connected to the respective vertical signal lines 55 through horizontal selection lines 59, to electrically conduct the transistors 57. Pixel signals from a column from which offset signals have been removed by the CDS 56 are read onto a horizontal signal line 58. The pixel signals are converted into voltage signals by an output circuit 61, and are outputted to the outside.

In an XY address type solid-state image pickup element of this kind, the columns respectively have different (or their own) vertical signal lines 55. Hence, pixel signals fed from the output circuit 61 are offset differently between individual columns if the CDSs 56 and the transistors 57 have characteristic variants. Various offsets which are respectively specific to the columns appear, as stripe-like fixed-pattern noise (hereinafter called column noise) on a display screen, and cause deterioration in image quality.

There has been a method for preventing this deterioration. In the method, only the column noise component is extracted from the solid-state image pickup element, and is maintained as a reference signal for correction. During a normal image pickup operation, the reference signal is subtracted from a signal output from the solid-state image pickup element, to correct column noise.

However, when the pixel part 52 is irradiated with light, a signal component based on the incident light is added to the column noise component. Therefore, this output signal cannot be used as a reference signal for correction.

Hence, according to Japanese Patent Application Laid-Open Publication No. 10-126697, the pixel part 52 is constituted by an effective pixel area A, a vertical optical black (hereinafter abbreviated as VOPB) area B, and a horizontal optical black (HOPB) area C, as shown in FIG. 2, and performs detection/correction of the column noise. The effective pixel area A is irradiated with light. In the vertical optical black area B and the horizontal optical black area C, irradiation of light is shielded over several lines to several ten lines by a light-shield plate such as an aluminum thin film or the like.

SUMMARY OF THE INVENTION

However, when a black or white defective pixel exists among pixels arranged in the VOPB area B, this defective pixel influences the detected value of the column noise amount. If column noise correction is performed on column noise influenced by the defective pixel, stripe-like noise is generated.

For example, if there is a white defective pixel in a column, a greater value than an actual column noise amount is detected as column noise. If correction is thus carried out on the basis of the greater column noise amount, dark stripe-like noise is generated. Alternatively, if there is a black defective pixel in a column, a smaller value than an actual column noise amount is detected as column noise. If correction is carried out on the basis of the smaller column noise amount, bright stripe-like noise is generated.

The present invention has hence been made to provide a signal processing device and a signal processing method in which, even when a defective pixel exists in the VOPB area B, column noise can be detected accurately, and column noise correction can be carried out.

According to the present invention, a signal processing device includes: a solid-state image pickup element having a pixel part including pixels uniformly arrayed in a matrix of lines and columns, the pixel part including an effective pixel area to be irradiated with light, and a vertical light-shielded pixel area where irradiation of light is shielded, a vertical scanning circuit which controls control electrodes of pixels arranged in identical one of the lines and connected in common by a vertical selection line, a horizontal scanning circuit which controls control electrodes of vertical signal lines connected in common to main electrodes of pixels arranged in identical one of the columns, to output sequentially pixel signals in units of lines to horizontal signal lines, the pixel signals being outputted through the vertical signal lines, and an output circuit which outputs pixel signals from the horizontal signal lines; a clamp means for clamping, to a predetermined reference value, black level values of pixel signals from the vertical light-shielded pixel area and effective pixel area, which are outputted from the output circuit of the solid-state image pickup element; a threshold determination means for determining a threshold value, based on the predetermined reference value; a determination means for determining whether or not pixel signals from the vertical light-shielded pixel area that have the black level value clamped to the reference value by the clamp means exceed the threshold value determined by the threshold determination means; a defective pixel detector means for detecting a defective pixel among pixels arranged in the vertical light-shielded pixel area; and a signal processor means for performing a predetermined signal processing on pixel signals from the vertical light-shielded pixel area that have a black level value clamped to the reference value by the clamp means.

According to the present invention, a signal processing method for a signal processing device having a solid-state image pickup element having a pixel part including pixels uniformly arrayed in a matrix of lines and columns, the pixel part including an effective pixel area to be irradiated with light, and a vertical light-shielded pixel area where irradiation of light is shielded, a vertical scanning circuit which controls control electrodes of pixels arranged in identical one of the lines and connected in common by a vertical selection line, a horizontal scanning circuit which controls control electrodes of vertical signal lines connected in common to main electrodes of pixels arranged in identical one of the columns, to output sequentially pixel signals in units of lines to horizontal signal lines, the pixel signals being outputted through the vertical signal lines, and an output circuit which outputs pixel signals from the horizontal signal lines, the method includes: a clamp step of clamping black level values of pixel signals from the vertical light-shielded pixel area and effective pixel area, which are outputted from the output circuit of the solid-state image pickup element, to a predetermined reference value; a threshold determination step of determining a threshold value, based on the predetermined reference value; a determination step of determining whether or not pixel signals from the vertical light-shielded pixel area which have the black level value clamped to the reference value in the clamp step exceed the threshold value determined in the threshold determination step; a defective pixel detection step of detecting a defective pixel among pixels arranged in the vertical light-shielded pixel area based on a determination result of the determination step; and a signal processing step of performing a predetermined signal processing on pixel signals from the vertical light-shielded pixel area that have a black level value clamped to the reference value in the clamp step.

In the present invention, pixel signals that exceed a predetermined threshold value are regarded as defective signals by the defect remover, among pixel signals of the VOPB area which have a black level value set to the zero level by the digital clamp. Defective pixels corresponding to the defective signals are detected. Influence from the defective pixels is removed. A column noise component is detected by a column noise component detector from pixel signals from which influence from the defective pixels has been removed. Based on the column noise component, column noise in pixel signals from the effective pixel area is corrected by the column noise corrector. Therefore, even if a defective pixel exists in the VOPB area, column noise can be accurately detected, and column noise correction of pixel signals from the effective pixel area can be performed accurately.

DETAILED DESCRIPTION OF THE PREFERRED EMBODIMENTS

Hereinafter, a description will be made of a signal processing device and a signal processing method according to an embodiment of the present invention.

Figure 1:
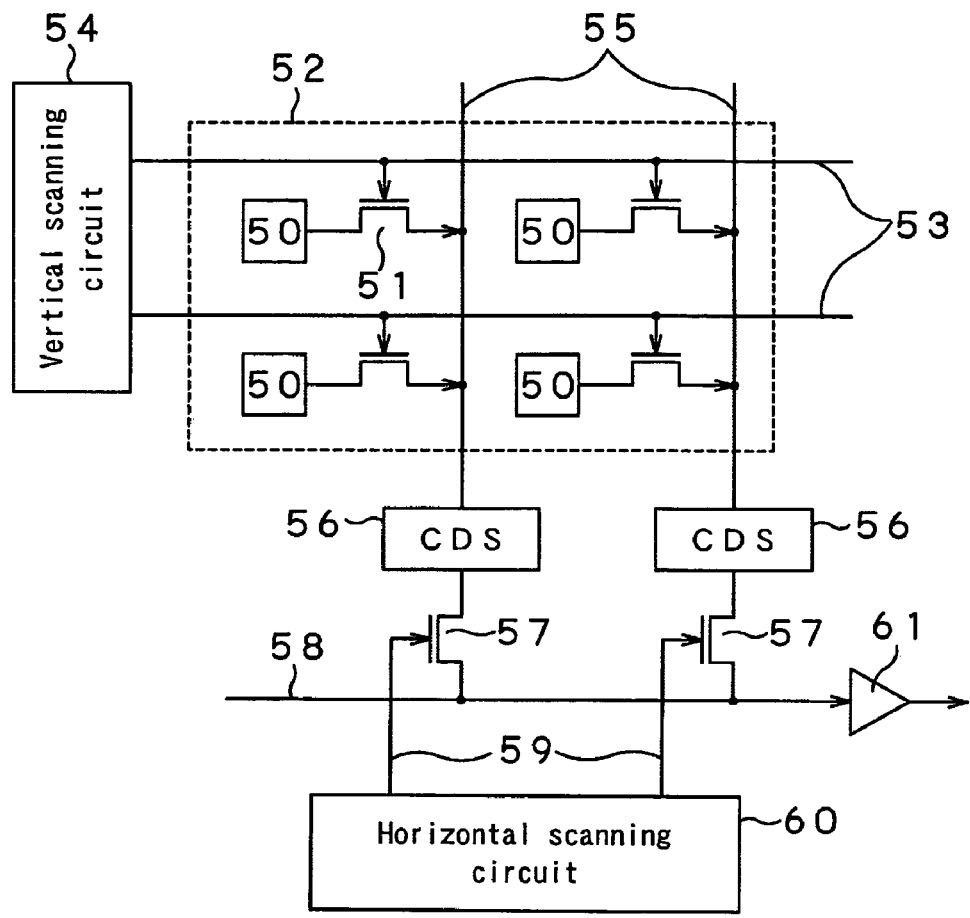
FIG. 1 is a schematic view showing the structure of a solid-state image pickup element.
Figure 2:
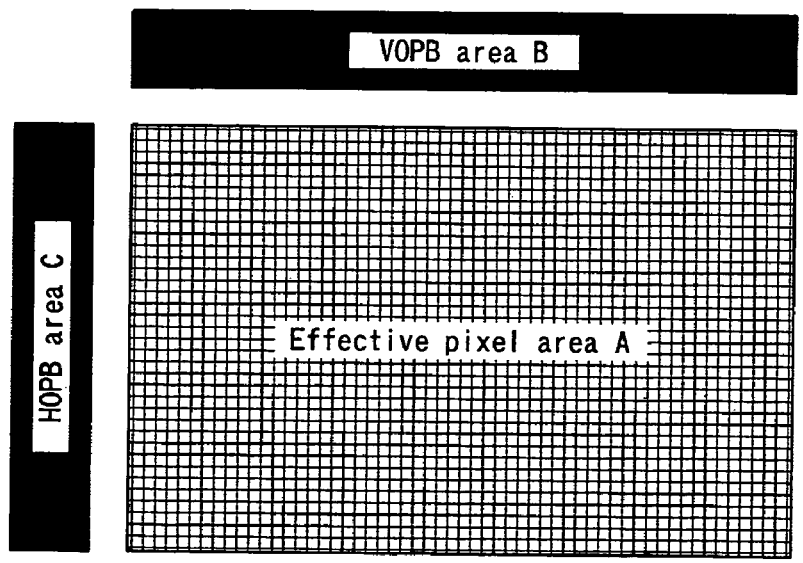
FIG. 2 is a view showing a state where a pixel part of the solid-state image pickup element is constructed by dividing the pixel part into an effective pixel area, a VOPB area, and a HOPB area.
Figure 3:
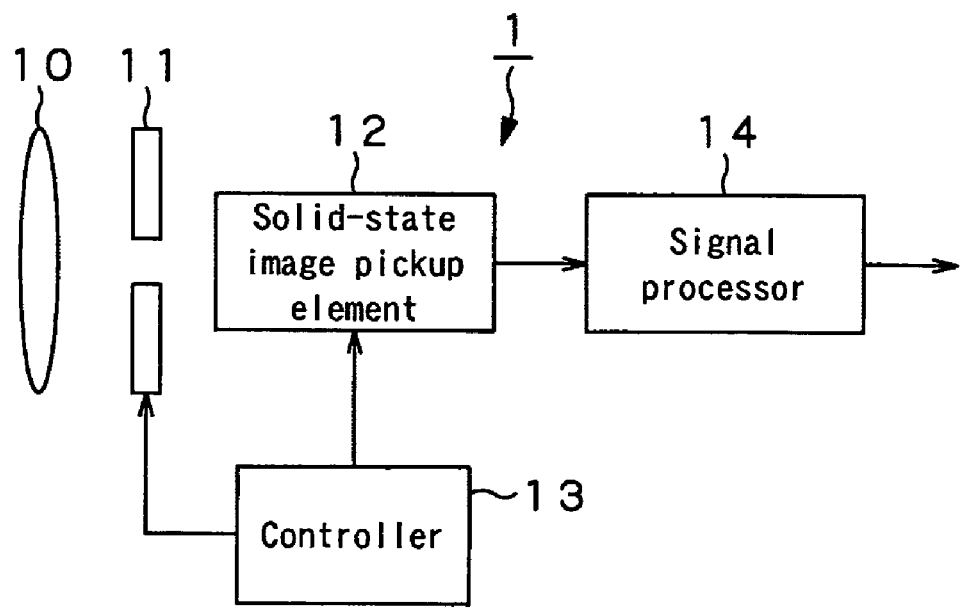
FIG. 3 is a block diagram showing the structure of a signal processing device according to the present invention.

As shown in FIG. 3, a signal processing device 1 has: a lens 10 which converges incident light; a shutter 11 which allows light converged by the lens 10 to pass for a predetermined time; a solid-state image pickup element 12 which picks up an image of an object which enters as light through the lens 10 and the shutter 11; a controller 13 which controls the shutter 11 and the solid-state image pickup element 12; and a signal processor 14 which performs a predetermined signal processing on an image signal picked up by the solid-state image pickup element 12.

Figure 4:
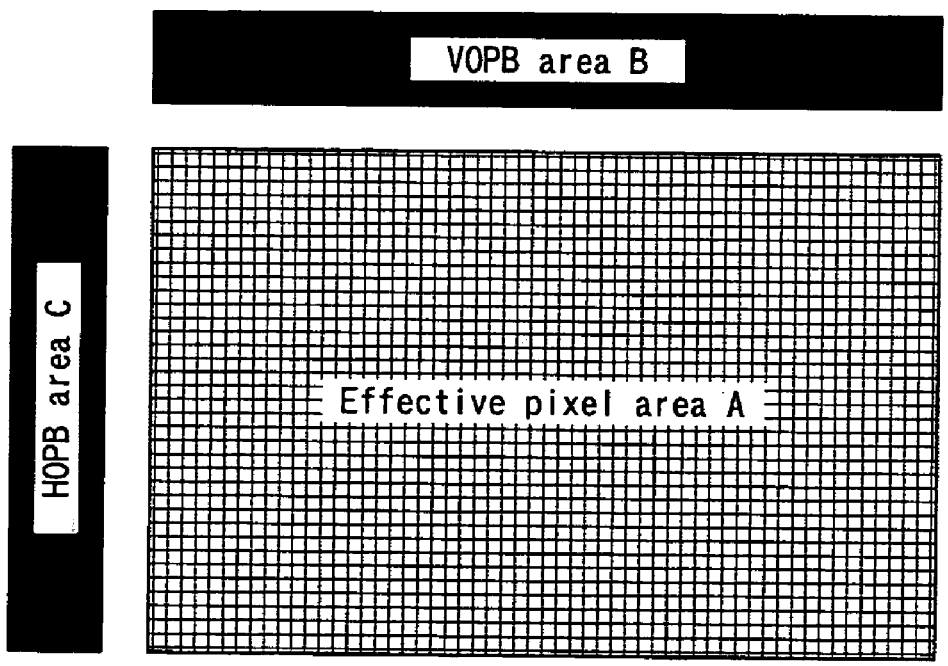
FIG. 4 is a view showing a state where the pixel part of the solid-state image pickup element is constructed by dividing the pixel part into an effective pixel area, a VOPB area, and a HOPB area.

Light emitted from the object enters into the solid-state image pickup element 12 through an optical system including the lens 10 and the shutter 11. The solid-state image pickup element 12 has a pixel part which picks up an image of the object. As shown in FIG. 4, the pixel part is constituted by an effective pixel area A irradiated with light, a vertical optical black (hereinafter called VOPB) area B where irradiation of light is shielded over several lines to several ten lines by a light-shield plate such as an aluminum thin film or the like, and a horizontal optical black (hereinafter called HOPB) area C where irradiation of light is shielded over several columns to several ten columns by a light-shield plate such as an aluminum thin film or the like.

The controller 13 controls opening/closing of the shutter 11. The controller 13 controls the solid-state image pickup element 12, to make a signal processor 14 output a pixel signal S1 selectively outputted from pixels arranged in the effective pixel area A, VOPB area B, and HOPB area C.

Figure 5:
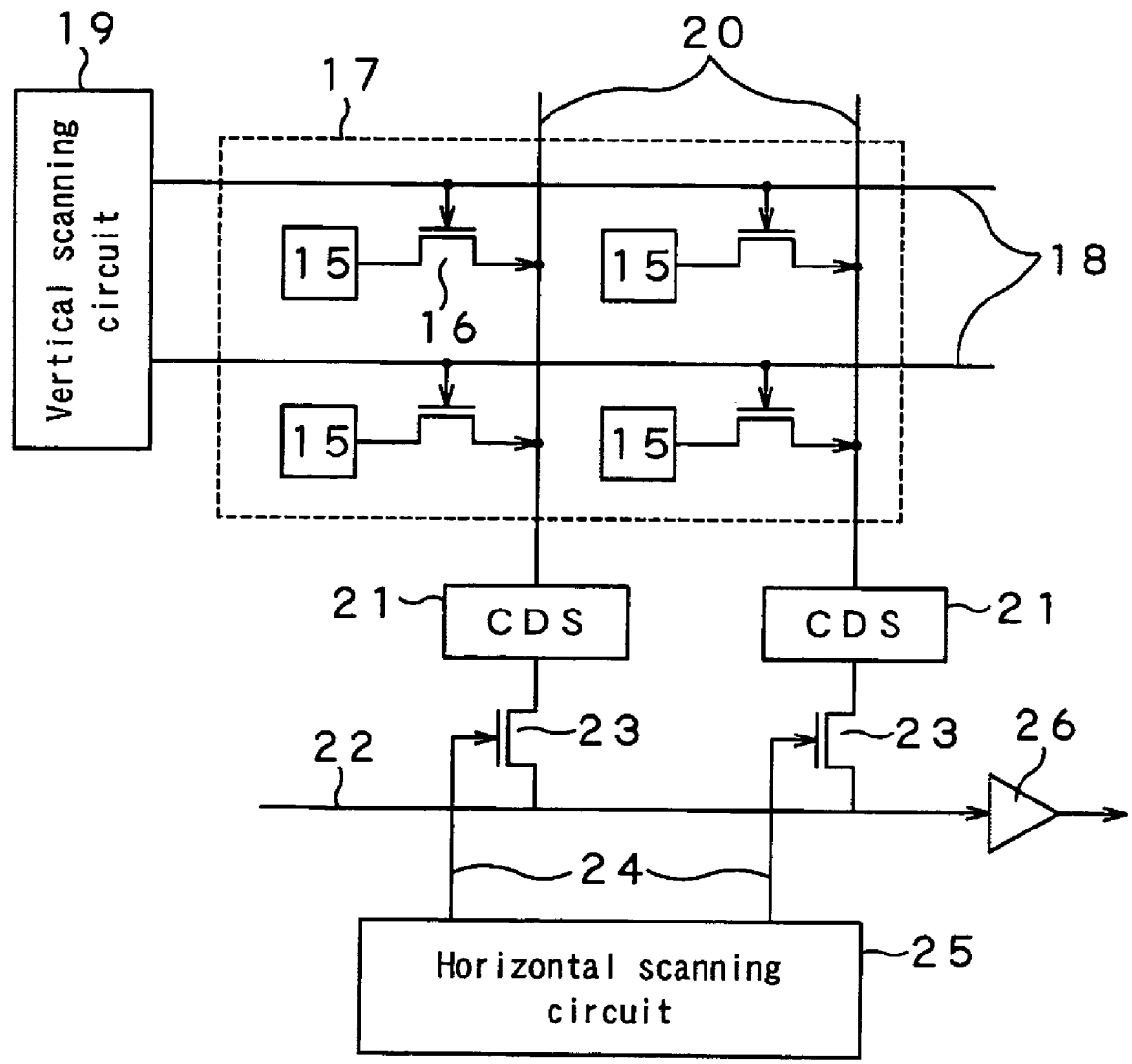
FIG. 5 is a schematic view showing the structure of the solid-state image pickup element.

The solid-state image pickup element 12 will now be described with reference to FIG. 5. The solid-state image pickup element 12 has: photosensitive parts 15 of, for example, an XY address type which store electric charges in accordance with irradiation of light, as shown in FIG. 5; a pixel part 17 constituted by pixel transistors 16 which output electric charges stored in the photosensitive part 15 and are arranged in a matrix of lines and columns; a vertical scanning circuit 19 which applies a pulse signal to vertical selection lines 18 each connecting pixels arranged in every one of lines of the matrix of the pixel part 17; correlative double sampling circuits (CDSs) 21 which remove offset signals from signals fed to vertical signal lines 20 by applying a pulse signal from the vertical scanning circuit 19, the vertical signal lines 20 each connecting pixels arranged in one of columns of the matrix of the pixel part 17; transistors 23 for feeding, to horizontal signal lines 22, signal from which offset signals have been removed by the CDSs 21; a horizontal scanning circuit 25 which supplies the transistors 23 with a pulse signal through horizontal selection lines 24, to feed the signals from which offset signals have been removed by the CDSs 21, to the horizontal signal lines 22; and an output circuit 26 which supplies the signal processor 14 with the signals fed to the horizontal scanning circuit 25.

In the solid-state image pickup element 12 of the XY-address type, the vertical signal lines 20 are different from each other between columns of pixels arrayed. Therefore, the pixel signal outputted from the output circuit 26 is influenced by offsets which vary between the columns if there is a characteristic variant between the CDSs 21 or the transistors 23. The offset for every column appears as stripe-like fixed pattern noise (hereinafter called column noise) on the display screen. This is a factor which causes deterioration in image quality. The signal processor 14 in the rear stage of the solid-state image pickup element 12 removes column noise of this kind.

Figure 6:
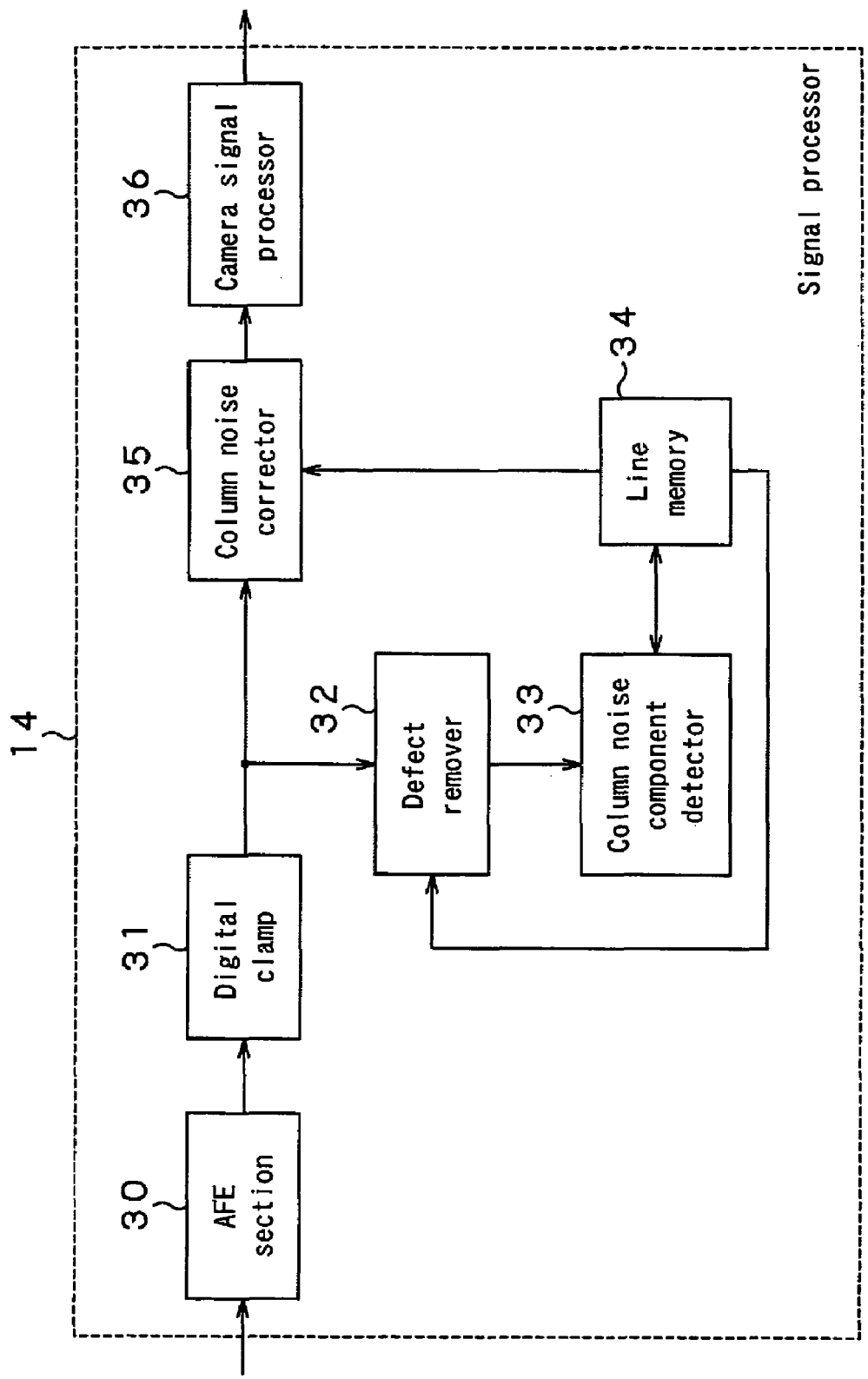
FIG. 6 is a block diagram showing the structure of a signal processor provided in the solid-state image pickup element.

Next, the structure of the signal processor 14 will be described below. As shown in FIG. 6, the signal processor 14 has: an AFE (analog front end) section 30 which converts an output signal of the solid-state image pickup element 12 into a digital signal; a digital clamp 31 which performs a subtraction processing on a black level value of the HOPB area C from pixel signals supplied from the AFE section 30; a defect remover 32 which removes influence of a defect pixel from pixel signals corresponding to the VOPB area B, which are outputted from the digital clamp 31; a column noise component detector 33 which detects fixed-pattern noise (hereinafter called a column noise component) from pixel signals from the VOPB area B from which influence from defective signals has been removed by the defect remover 32, and detects black level value of the VOPB area B; a line memory 34 which stores column noise components detected by the column noise component detector 33; a column noise corrector 35 which corrects column noise components of the pixel signals of the effective pixel area A supplied from the AFE section 30, based on a column noise component stored in the line memory 34; and a camera signal processor 36 which performs a predetermined camera processing on an output signal from the column noise corrector 35.

The AFE section 30 converts pixel signals supplied from the solid-state image pickup element 12 into digital signals, and outputs the converted pixel signals.

The digital clamp 31 detects the black level value of the HOPB area C from pixel signals supplied from the AFE section 30, and subtracts the black level value of the HOPB area C detected from the pixel signals from the effective pixel area A and VOPB area B. The digital clamp 31 supplies the defect remover 32 with a signal obtained by subtracting the black level value of the HOPB area C from pixel signals from the VOPB area B. On the other side, the digital clamp 31 supplies the column noise corrector 35 with a signal obtained by subtracting the black level value of the HOPB area C from pixel signals from the effective pixel area A.

The defect remover 32 is supplied with pixel signals obtained by subtracting the black level of the HOPB area C, from pixel signals of the VOPB area B supplied by the digital clamp 31, and removes influence of defective pixels from the supplied pixel signals. The defect remover 32 outputs pixel signals after the removal, to the column noise component detector 33. The structure of the defect remover 32 will now be described with reference to FIG. 7.

Figure 7:
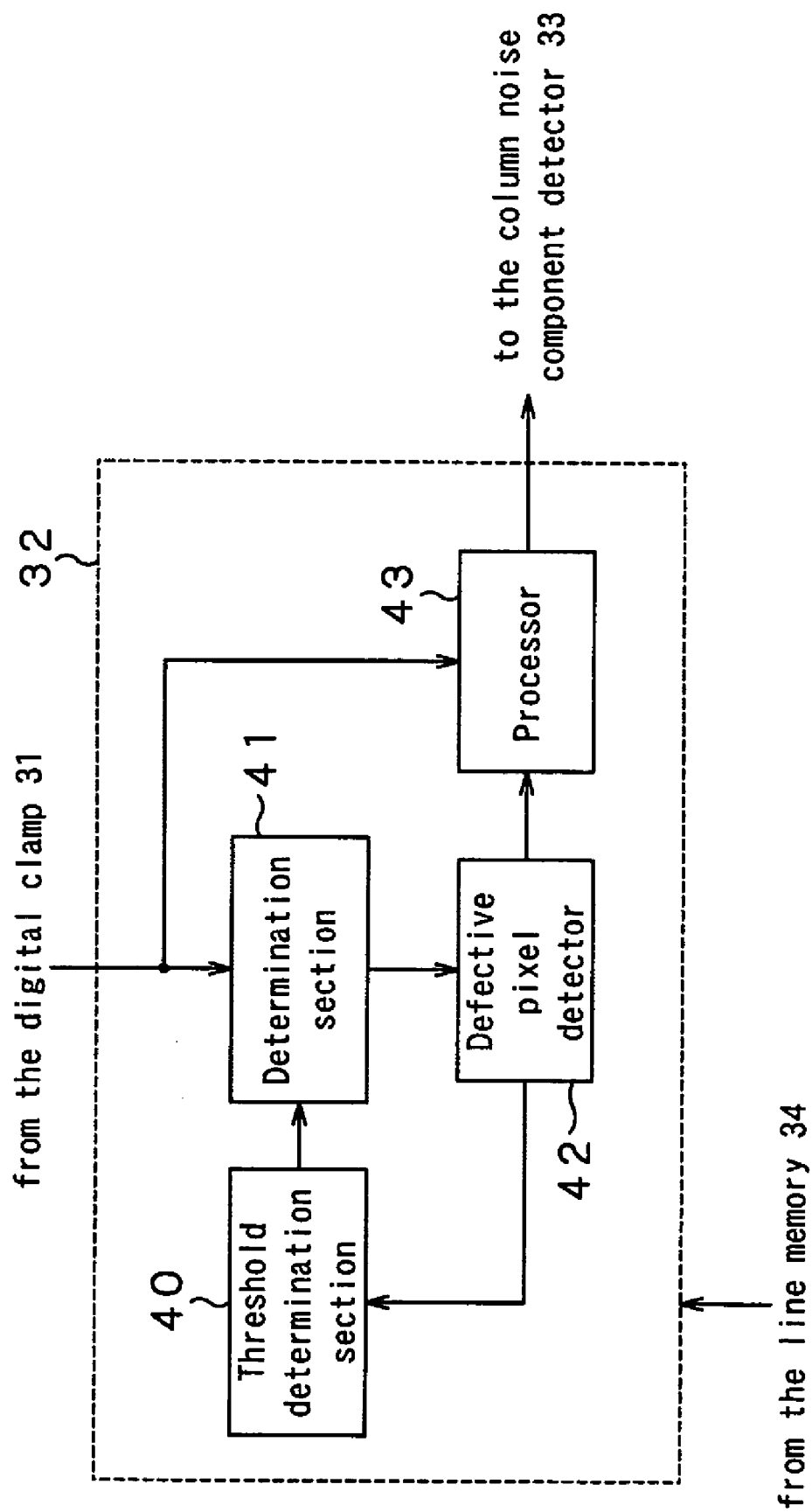
FIG. 7 is a block diagram showing the structure of a defect remover provided in the solid-state image pickup element.

As shown in FIG. 7, the defect remover 32 has: a threshold determination section 40 which determines a threshold value on the basis of a predetermined reference value (at which the signal level is at the zero level); a determination section 41 which determines whether or not pixel signals from the VOPB area B, the black level value of which is clamped at the predetermined reference value by the digital clamp 31, exceeds the threshold value determined by the threshold determination section 40; a defective pixel detector 42 which detects a defective pixel among pixels arranged in the VOPB area B, on the basis of a determination result of the determination section 41; and a processor 43 which performs a predetermined signal processing on pixel signals from the VOPB area B which are supplied from the digital clamp 31, on the basis of a detection result of the defective pixel detector 42.

A further description will be made below of two methods adopted to detect a defective pixel by the defect remover 32 according to the present invention.

Figure 8:
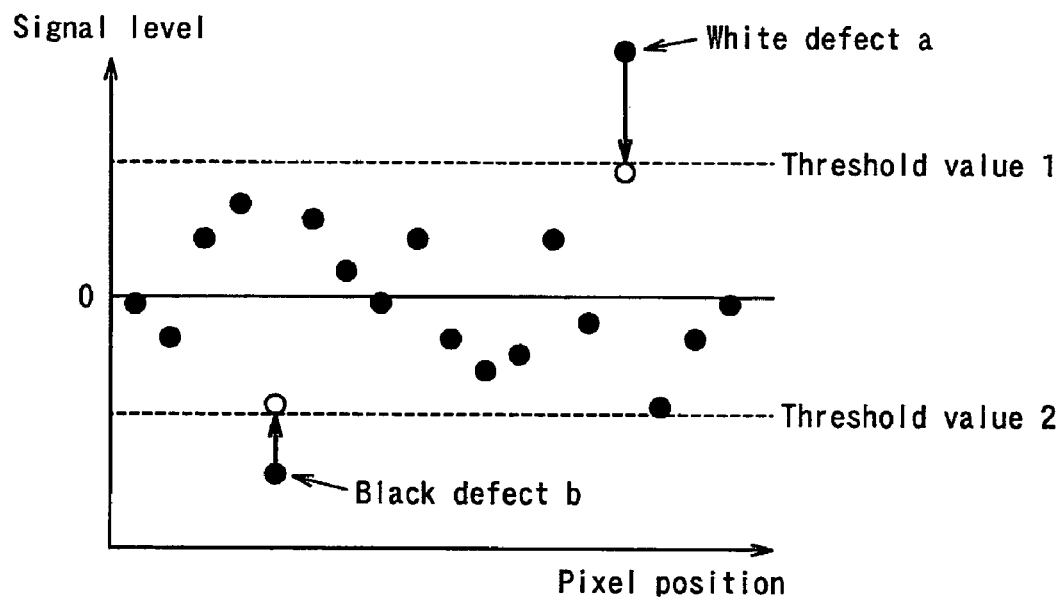
FIG. 8 is a graph showing a waveform of pixel signals from the VOPB area which have variants about the zero level as a center, due to column noise and random noise.

The first detection method will now be described. The signal level of the black level value of pixel signals which pass through the digital clamp 31 is at the zero level. That is, pixel signals from the VOPB area B have variants about the zero level as a center, due to column noise and random noise which is caused by a dark current or the like, as shown in FIG. 8. The threshold determination section 40 determines a threshold value, referring to values which signals of the column noise and random noise can take. Pixels having values exceeding the threshold value are determined as being defective pixels. The method of determining the threshold value will be, for example, as follows. Signals of the random noise and column noise are subjected to an addition processing. A standard deviation of addition result values obtained by the addition processing is calculated. A range defined by multiplying the standard deviation by three is taken as the threshold value. In this method, 99.5% of pixels which are not defective can be used in calculations for detecting column noise.

Figure 9:
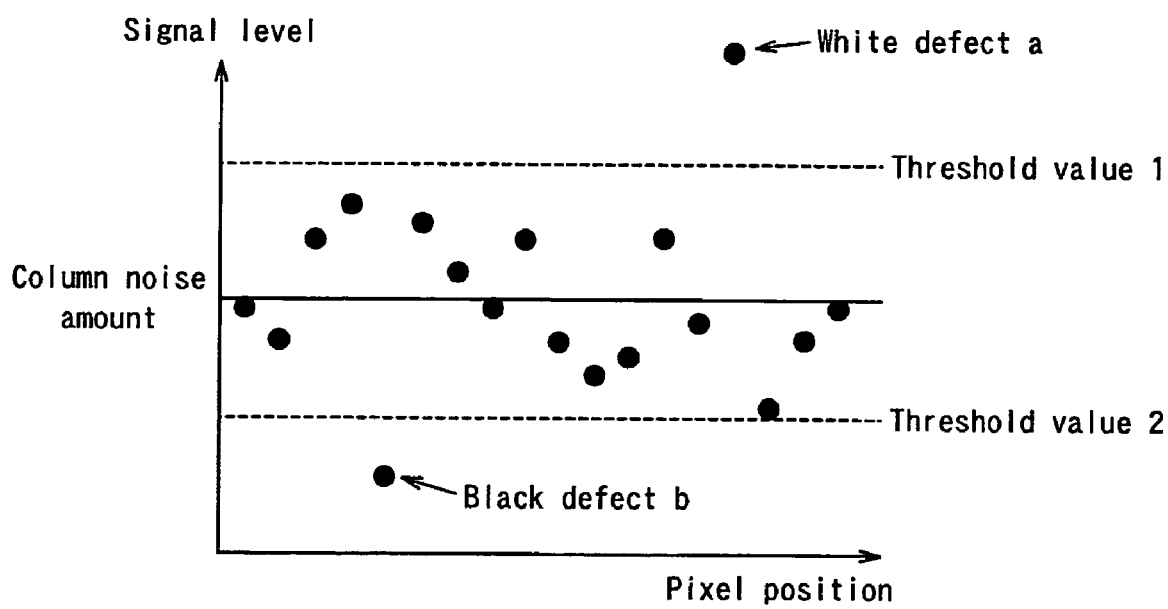
FIG. 9 is a graph showing the waveform of pixel signals from the VOPB area which have variants about a column noise amount as a center, due to column noise.

Next, the second detection method will be described. In the signal processing device 1, detection is carried out for every column, in case of detecting column noise of the VOPB area B. For example, when column noise being calculated can be used in one frame while detecting column noise for plural frames, the column noise being detected is regarded as the black level of the column. Where attention is paid to one particular column, pixel signals are let have variants equivalent to amounts corresponding to random noise, about the column noise amount as a center, as shown in FIG. 9. Referring to values which the random noise can take, the threshold value is determined, and those pixels that exceed the threshold value are regarded as defective pixels. The method of determining the threshold value is, for example, as follows. A standard deviation of random noise is calculated, and a range defined by multiplying the standard deviation by three is taken as the threshold value. In this method, 99.5% of pixels which are not defective can be used in calculations for detecting column noise.

Note that the methods described above are capable of constant detection, unlike the method of storing positions of defective pixels in advance.

Next, further two methods will be described with respect to how to deal with a detected defective pixel.

The first method thereof will be a method in which signals of pixels regarded as defective pixels by the defect pixel detector 42 are subjected to overflow limitation. For example, as shown in FIG. 8, the defect pixel detector 42 regards, as defective signals, those signals that are outside the threshold value with respect to the zero level as a center. The defect pixel detector 42 supplies the processor 43 with those signals. Based on a detection result of the defect pixel detector 42, the processor 43 performs a predetermined signal processing on pixel signals from the VOPB area B, which are supplied by the digital clamp 31. For example, as shown in FIG. 8, the processor 43 overflow-limits such a pixel (e.g., the pixel a causing a white defect) that has a signal level greater than a threshold value 1 determined by the threshold determination section 40. In other words, the processor 43 performs a processing of lowering the signal level of the white defective pixel a to the signal level of the threshold value 1. Also, the processor 43 overflow-limits such a pixel (e.g., the pixel b causing a black defect) that has a signal level smaller than another threshold value 2 determined by the threshold determination section 40. In other words, the processor 43 raises the signal level of the black defective pixel b to the signal level of the threshold value 2.

By performing this kind of processing, absolute values of signals of white and black defective pixels can be made so small that influence on column noise detection from defective pixels can be reduced.

The second method is a method in which signals of those pixels that are regarded as defective pixels by the defective pixel detector 42 are removed from pixel signals from the VOPB area B. Based on a detection result of the defective pixel detector 42, the processor 43 performs a processing of removing signals of defective pixels from pixel signals from the VOPB area B, which are supplied by the digital clamp 31.

By performing this processing, influence on column noise detection from defective pixels can be reduced.

Next, a method of determining a threshold value by the threshold determination section 40 will be described.

The threshold determination section 40 determines a threshold value from a column noise amount and a random noise amount of the pixel part. However, when detecting column noise of pixels arranged in the VOPB area B, the number of pixels including those pixels that have not been used in this detection are counted. Therefore, if the number of those pixels is great, the range of the threshold value is controlled to become wide. This is because, if the number of pixels not used in calculations for column noise detection is too great, the number of samples of pixels to be subjected to calculations is so small that the detection accuracy deteriorates. If the number of detected defect signals is too small, the range of the threshold value is controlled to become narrow, in accordance with the detection result of the defect pixel detector 42. This is because the influence on column noise detection from defective pixels is so great that the range of the threshold value has to be narrowed to raise detection accuracy. Note that the threshold determination section 40 may be arranged in a structure in which the detection result of the defect pixel detector 42 is constantly fed back.

The column noise component detector 33 detects a column noise component from signals supplied from the defect remover 32. Paying attention to that pixels in one identical column have an equal amount of column noise, the column noise component detector 33 detects a column noise component from pixel signals from the VOPB area B, from which influence from defective pixels have been removed by the defect remover 32. The column noise component detector 33 stores the detection result into the line memory 34.

A description will now be made of operation of detecting a difference value of the black level value of the VOPB area B, by the column noise component detector 33. As described above, in the digital clamp 31, the black level value of the HOPB area C is subtracted from the pixel signals from the VOPB area B. Therefore, if there is no difference between the black level values of the HOPB area C and VOPB area B, the black level value of the VOPB area B is detected to be zero by the column noise component detector 33.

Otherwise, if there is a difference between the black level values of the HOPB area C and VOPB area B, the black level value of the VOPB area B is detected to be a positive or negative value by the column noise component detector 33. If the black level value of the VOPB area B is a positive value, it means that the black level value of the VOPB area B is higher than that of the HOPB area C. Alternatively, if the black level value of the VOPB area B is a negative value, it means that the black level value of the VOPB area B is lower than that of the HOPB area C.

Therefore, in order to detect the difference between the black level values of the HOPB area C and VOPB area B, it is necessary for the column noise component detector 33 to detect only the black level value of the VOPB area B because the black level value of the HOPB area C is zero. The method of detecting the black level value of the VOPB area B may be arranged so as to integrate the whole VOPB area B or to use a partial area of the VOPB area B for integration.

The column noise corrector 35 corrects column noise of the pixel signals outputted from the pixels arranged in the effective pixel area A, based on the noise component detected by the column noise component detector 33. The column noise corrector 35 supplies the corrected signals to the camera signal processor 36. The camera signal processor 36 performs a predetermined camera signal processing on the signals whose column noise has been subjected to the correction processing by the column noise corrector 35.

Thus, in the signal processing device 1 according to the present invention, pixel signals whose levels exceed a predetermined threshold value, are regarded as defective signals by the defect remover 32, among pixel signals of the VOPB area B which have a black level value set to the zero level by the digital clamp 31. Defective pixels corresponding to the defective signals are detected. Influence from the defective pixels is removed. A column noise component is detected by the column noise detector 33 from pixel signals from which influence from the defective pixels has been removed. Based on the column noise component, column noise in pixel signals from the effective pixel area A is corrected by the column noise corrector 35. Therefore, even if a defective pixel exists in the VOPB area B, column noise can be accurately detected, and column noise correction of pixel signals from the effective pixel area A can be performed accurately.

The present invention is not limited to the above embodiment described with reference to the drawings. Various modifications, substitutions, or equivalents are possible without deviating from the scope of the appended claims and from the subject matters thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device comprising:
   a solid-state image pickup element having:
      a pixel part including pixels arrayed in a matrix of lines and columns, the pixel part including an effective pixel area to be irradiated with light, and a vertical light-shielded pixel area where irradiation of light is shielded,
      a vertical scanning circuit which controls control electrodes of pixels arranged in a line and connected by a vertical selection line,
      a horizontal scanning circuit which controls control electrodes of vertical signal lines to output pixel signals to horizontal signal lines, and
      an output circuit which outputs pixel signals from the horizontal signal lines;
   means for clamping, to a predetermined reference value, black level values of pixel signals from the vertical light-shielded pixel area and the effective pixel area, which are outputted from the output circuit;

means for determining a threshold value, the threshold value defining the bounds of a range of acceptable black level values that fall between the predetermined reference value and the threshold value, the threshold value being defined by calculating a standard deviation of random noise from the vertical light-shielded pixel area and performing a multiplication operation on the standard deviation to find the threshold value;

means for determining whether pixel signals from the vertical light-shielded pixel area that have the black level value clamped to the reference value exceed the threshold value;

means for detecting a defective pixel among pixels arranged in the vertical light-shielded pixel area when a pixel signal exceeds the threshold value; and means for correcting the detected defective pixel by adjusting the pixel signal level of the detected defective pixel to equal the threshold value.

2. The signal processing device according to claim 1, further comprising:

means for detecting a column noise component from pixel signals from the vertical light-shielded pixel area; and means for correcting column noise included in pixel signals from the effective pixel area that have a black level value clamped to the predetermined reference value based on the column noise component.

3. The signal processing device according to claim 1, wherein the range of acceptable black level values is changed, based on the detected defective pixel.

4. A signal processing method for a signal processing device having a solid-state image pickup element having:

a pixel part including pixels arrayed in a matrix of lines and columns, the pixel part including an effective pixel area to be irradiated with light, and a vertical light-shielded pixel area where irradiation of light is shielded, a vertical scanning circuit which controls control electrodes of pixels arranged in a line and connected by a vertical selection line, a horizontal scanning circuit which controls control electrodes of vertical signal lines to output pixel signals to horizontal signal lines, and an output circuit which outputs pixel signals from the horizontal signal lines, the method comprising:

clamping black level values of pixel signals from the vertical light-shielded pixel area and the effective pixel area to a predetermined reference value;

determining a threshold value, the threshold value defining the bounds of a range of acceptable black level values that fall between the predetermined reference value and the threshold value, the threshold value being defined by calculating a standard deviation of random noise from the vertical light-shielded pixel area and performing a multiplication operation on the standard deviation to find the threshold value;

determining whether pixel signals from the vertical light-shielded pixel area which have the black level value clamped to the reference value exceed the threshold value;

detecting a defective pixel among pixels arranged in the vertical light-shielded pixel area when a pixel signal exceeds the threshold value; and correcting the detected defective pixel by adjusting the pixel signal level of the detected defective pixel to equal the threshold value.

5. The signal processing method according to claim 4, further comprising:

detecting a column noise component from pixel signals from the vertical light-shielded pixel area; and correcting column noise included in pixel signals from the effective pixel area that have a black level value clamped to the predetermined reference value based on the column noise component.

6. The signal processing method according to claim 4, wherein the range of acceptable black level values is changed, based on the detected defective pixel.

7. A signal processing device comprising:

a solid-state image pickup element having:

a pixel part including pixels uniformly arrayed in a matrix of lines and columns, the pixel part including an effective pixel area to be irradiated with light, and a vertical light-shielded pixel area where irradiation of light is shielded, a vertical scanning circuit which controls control electrodes of pixels arranged in a line and connected by a vertical selection line, a horizontal scanning circuit which controls control electrodes of vertical signal lines to output pixel signals to horizontal signal lines, and an output circuit which outputs pixel signals from the horizontal signal lines;

a clamp section which clamps, to a predetermined reference value, black level values of pixel signals from the vertical light-shielded pixel area and the effective pixel area, which are outputted from the output circuit;

a threshold determination section which determines a threshold value, the threshold value defining the bounds of a range of acceptable black level values that fall between the predetermined reference value and the threshold value, the threshold value being defined by calculating a standard deviation of random noise from the vertical light-shielded pixel area and performing a multiplication operation on the standard deviation to find the threshold value;

a determination section which determines whether pixel signals from the vertical light-shielded pixel area that have the black level value clamped to the reference value exceed the threshold value;

a defective pixel detector which detects a defective pixel among pixels arranged in the vertical light-shielded pixel area when a pixel signal exceeds the threshold value; and a signal processor which corrects the detected defective pixel by adjusting the pixel signal level of the detected defective pixel to equal the threshold value.

* * * * *